United States Patent [19]

Fukasawa et al.

[11] Patent Number: 5,894,573
[45] Date of Patent: Apr. 13, 1999

[54] PROGRAM CONTROLLING METHOD HAVING TRANSFER OF CODE AND DATA AMONG PROGRAMS AND APPARATUS THEREFOR

[75] Inventors: Toshihiko Fukasawa, Machida; Masahiko Yoshimoto, Yokohama; Shigeki Shibayama, Yokohama; Takahiro Kurosawa, Yokohama, all of Japan

[73] Assignee: Canon Kabushiki Kaisha, Tokyo, Japan

[21] Appl. No.: 08/812,080

[22] Filed: Mar. 6, 1997

Related U.S. Application Data

[63] Continuation of application No. 08/249,800, May 26, 1994, abandoned.

[30] Foreign Application Priority Data

May 27, 1993 [JP] Japan ..................... 5-126170

[51] Int. Cl.⁶ ..................................... G06F 9/44
[52] U.S. Cl. ............ 395/680; 395/672; 395/676; 395/683; 707/103
[58] Field of Search ................... 395/676, 672, 395/706, 680–684; 707/100–104, 1, 10, 619, 103

[56] References Cited

U.S. PATENT DOCUMENTS

| | | | |
|---|---|---|---|
| 4,814,971 | 3/1989 | Thatte | 395/575 |
| 5,247,678 | 9/1993 | Littleton | 395/700 |
| 5,359,721 | 10/1994 | Kempf et al. | 395/427 |
| 5,426,747 | 6/1995 | Weinreb et al. | 395/400 |
| 5,475,840 | 12/1995 | Nelson et al. | 395/700 |

OTHER PUBLICATIONS

"Objectstore Database System" by Charles Lamb et al.; Communication of ACM; Oct. 1991; vol. 54, No. 10; pp. 51–63.

Primary Examiner—Thomas G. Black
Assistant Examiner—Hosain T. Alam
Attorney, Agent, or Firm—Fitzpatrick, Cella, Harper & Scinto

[57] ABSTRACT

An arrangement for executing a process in a data processing system using first and second programs each including executable codes and data in coordinated fashion in which a portion of the data and executable codes from the first program is provided to the second program during execution of the process. In execution of the process, portions of the data and executable codes provided by the first program to the second program are forcibly added or forcibly substituted and executed by the second program. The data and executable code portions are provided by injection and the injection and execution are conducted by imparting an acknowledgement of the addition or substitution and execution to the first program by the second program.

16 Claims, 7 Drawing Sheets

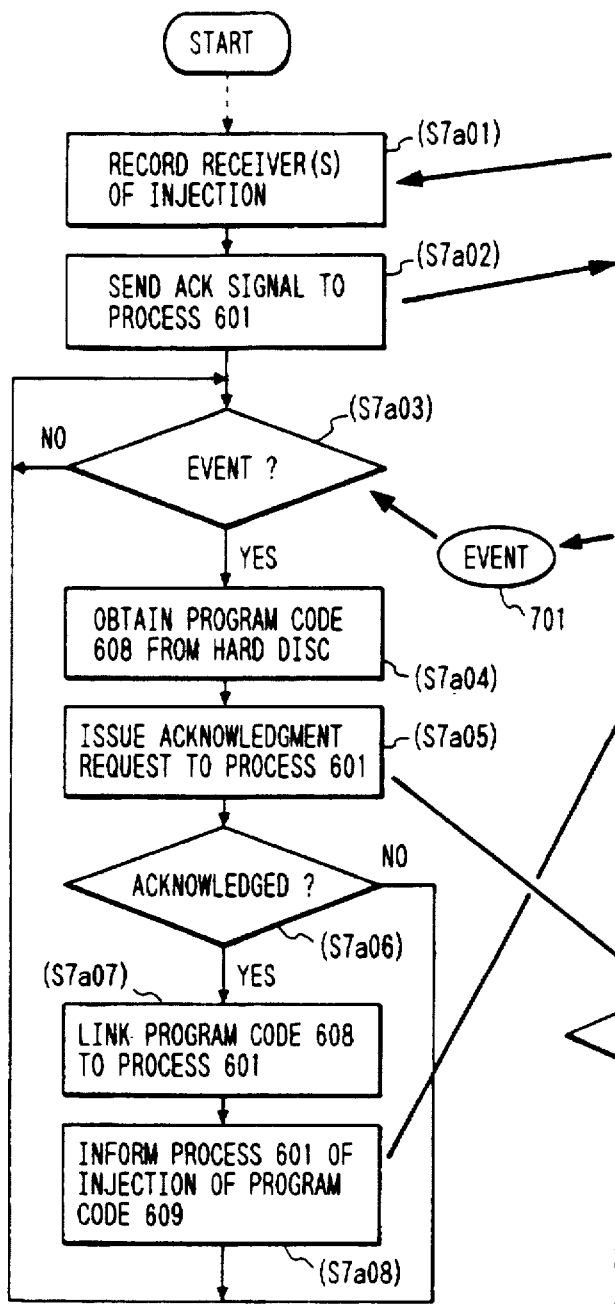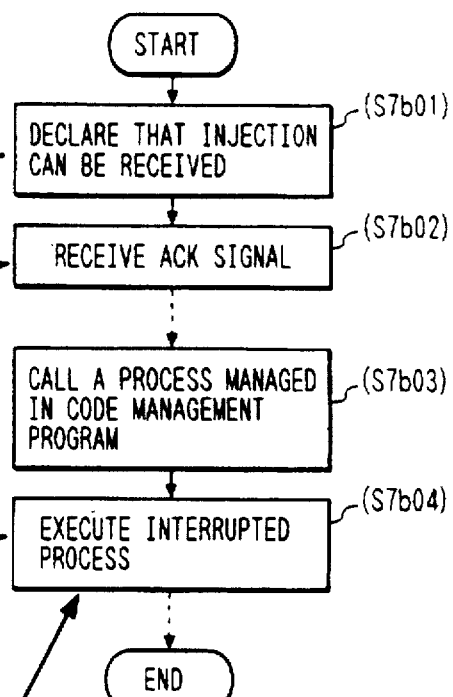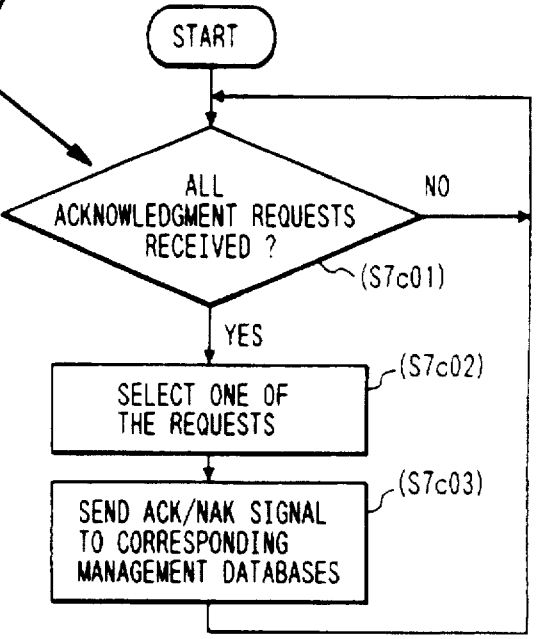

PROGRAM CONTROLLING METHOD HAVING TRANSFER OF CODE AND DATA AMONG PROGRAMS AND APPARATUS THEREFOR

This application is a continuation of application Ser. No. 08/249,800 filed May 26, 1994, now abandoned.

BACKGROUND OF THE INVENTION

1. Field of the Invention

The present invention relates to a program controlling method in a form of processing a plurality of programs in a coordinated manner, and an apparatus having the same.

More particularly, it relates to a program controlling method for implementing a system which requires a mechanism to cause a client to execute a request from a server or provide a new function to the client in a database system implemented as a server-client system, and an apparatus having the same.

2. Related Background Art

Recently, in a process of developing a complicated application program such as a DTP system or a drawing tool (picture drawing program), problems have been raised in that the programming is complex, the program becomes huge and switching depending on the situation is difficult to attain. In the prior art, the following methods have been proposed to solve those problems.

Object oriented database system (for example, an object oriented database system described in The Object Store Database System, CACM Vol. 10, pp50–63 (Oct. 1991)). It is a system which applies the concept of the object oriented database to a database system. A mechanism required when data having a complex structure is shared among a plurality of programs (for example, data persistency, parallel access control, version management) is provided. It can relieve the complexity of the programming which occurs in realizing the data sharing by the object oriented database system.

Dynamic loading/linking (for example, An Approach to Genuine Dynamic Linking, CSE-90-25, 8-1990, Div Computer Science, University of California). It is a mechanism to build in a function during the execution of the program instead of building it in the program during the development of the program. It is usually implemented by building in a module build-in procedure (loading and linking) as a function which can be called by the program during the development of the program. It is used as a mechanism for avoiding the increase of the size of the program and switching the content of process depending on the status.

Shared library (for example, a library which belongs to the Unix System V). A library means one or a group of files of modules which may possibly be shared by a plurality of programs. A shared library means those programs which call procedures in the files when they are executed. It is used as means for preventing the increase of the size of the program.

However, recently, as an application program such as groupware in which a plurality of programs share data having a very complex structure and program codes which depend on the structure of the data and which requires more complex form of sharing such as coordinated processing has been developed, the following problems are raised.

a. Change notification

For example, when a plurality of windows applications share data and it is required to always reflect the status of the shared data on the display, it is necessary to inform each change of the shared data by one application to other applications.

b. Ownership

In a data management application, particularly where the update of data or the access control is required, it may be required to force an application based on certain convention of the application.

c. Evaporation

In an application which refers the shared data, the data which is shared by a plurality of applications and should be persistently saved after the completion of the application and the temporary data which is inherent to the application and erased at the completion of the application may be mixedly present.

In such a circumstance, when reference information to the temporary data is included in the persistent data, the persistent data holds useless data after the completion of the application because the temporary data is erased at the completion of the application. In many cases, such useless data is interpreted as invalid data which may adversely affect to the application.

In the prior art, however, the plurality of programs share the data of very complex structure and the program codes which depend on the data structure, and the problems raised by the dynamic change of the status during the execution of the programs are not solved.

This is because the object oriented database system provides the centralized management system for the persistent data and it cannot solve the problem of complex distributed data management such as the change notification and the ownership or manage the non-persistent data such as the evaporated data.

Further, the function provided by the shared library is a mechanism for supporting the sharing of the program code which may be decided at the time of preparation of the program that cannot handle the problem which dynamically changes depending on the execution status.

In the dynamic loading/linking, the dynamic addition and execution of the program code may be conducted but it cannot provide a mechanism to manage the sharing of the program code. As a result, the dynamic loading/linking cannot attain the base of coordinated processing by the plurality of programs.

SUMMARY OF THE INVENTION

In the light of the problems encountered in the prior art, it is an object of the present invention to provide a program controlling method which conducts coordinated processing by providing a mechanism for sharing, adding and substituting normal data and executable program codes among a plurality of programs and a mechanism for executing the shared data and codes, and an apparatus having the same.

As explained above, the present invention provides the mechanism for sharing data and executable program codes among the programs, adding and changing the functions of the programs and the mechanism for executing the added or changed functions and an interface for using those mechanisms so that:

(1) a consistent operation can be forced to each program, (2) an optimum processing mechanism which complies with the status thereof can be provided to each program, (3) a size of each program can be reduced because a functional element may be added from time to time as required, and (4) the advantages of (1), (2) and (3) may be enjoyed without making the program complex.

In accordance with one aspect of the present invention, in a system for executing a first program and a second program in a coordinated fashion, a program controlling method is characterized in that the first program adds or substitutes appropriate data and program code to the second program during the execution of a process.

It is further characterized in that a shared memory is used to share the data and the program code.

It is further characterized in that the appropriate data and program code are provided in accordance with the execution status of the second program.

It is further characterized in that means for forcibly adding or substituting and executing the data and program code provided to the second program from the first program is provided.

It is further characterized in that the injection and execution of valid data and program code are conducted by imparting acknowledgement from the second program to the addition or substitution and the execution of the data and program code from the first program.

It is further characterized in that a mechanism for solving a request conflict when the addition or substitution and the execution of the data and program codes from a plurality of programs are requested is provided.

It is further characterized in that a protocol of process conducted between the first program and the second program is defined as the data and program code are added or substituted and executed.

It is further characterized in that a mechanism for parallel control between a plurality of program codes present in the second program is provided.

It is further characterized in that the data and program code to be added or substituted and executed are added to the first program from time to time.

It is further characterized in that the first program and the second program are executed on different computers through a network.

In accordance with another aspect of the present invention, in a system for executing a first program and a second program in a coordinated fashion, a program controlling apparatus is characterized in that the first program adds or substitutes appropriate data and program code to the second program during the execution of a process.

It is further characterized in that a shared memory is used to share the data and the program code.

It is further characterized in that the appropriate data and program code are provided in accordance with the execution status of the second program.

It is further characterized in that means for forcibly adding or substituting and executing the data and program code provided to the second program from the first program is provided.

It is further characterized in that the injection and execution of valid data and program code are conducted by imparting acknowledgement from the second program to the addition or substitution and the execution of the data and program code from the first program.

It is further characterized in that a mechanism for solving a request conflict when the addition or substitution and the execution of the data and program codes from a plurality of programs are requested is provided.

It is further characterized in that a protocol of the process conducted between the first program and the second program is defined as the data and program code are added or substituted and executed.

It is further characterized in that a mechanism for parallel control between a plurality of program codes present in the second program is provided.

It is further characterized in that the data and program code to be added or substituted and executed are added to the first program from time to time.

It is further characterized in that first program and the second program are executed on different computers through a network.

BRIEF DESCRIPTION OF THE DRAWINGS

FIGS. 7A, 7B and 7C are flow charts for illustrating the injection process in the program code shared system.

DETAILED DESCRIPTION OF THE PREFERRED EMBODIMENTS

As a first embodiment of the present invention, a multi-media data retrieval system is described.

The multi-media data retrieval system referred herein is an application for retrieving and displaying multi-media data such as images, sounds and documents managed by a database.

Referring to FIGS. 2 through 4C, the multi-media data retrieval system is now explained.

Figure 2:
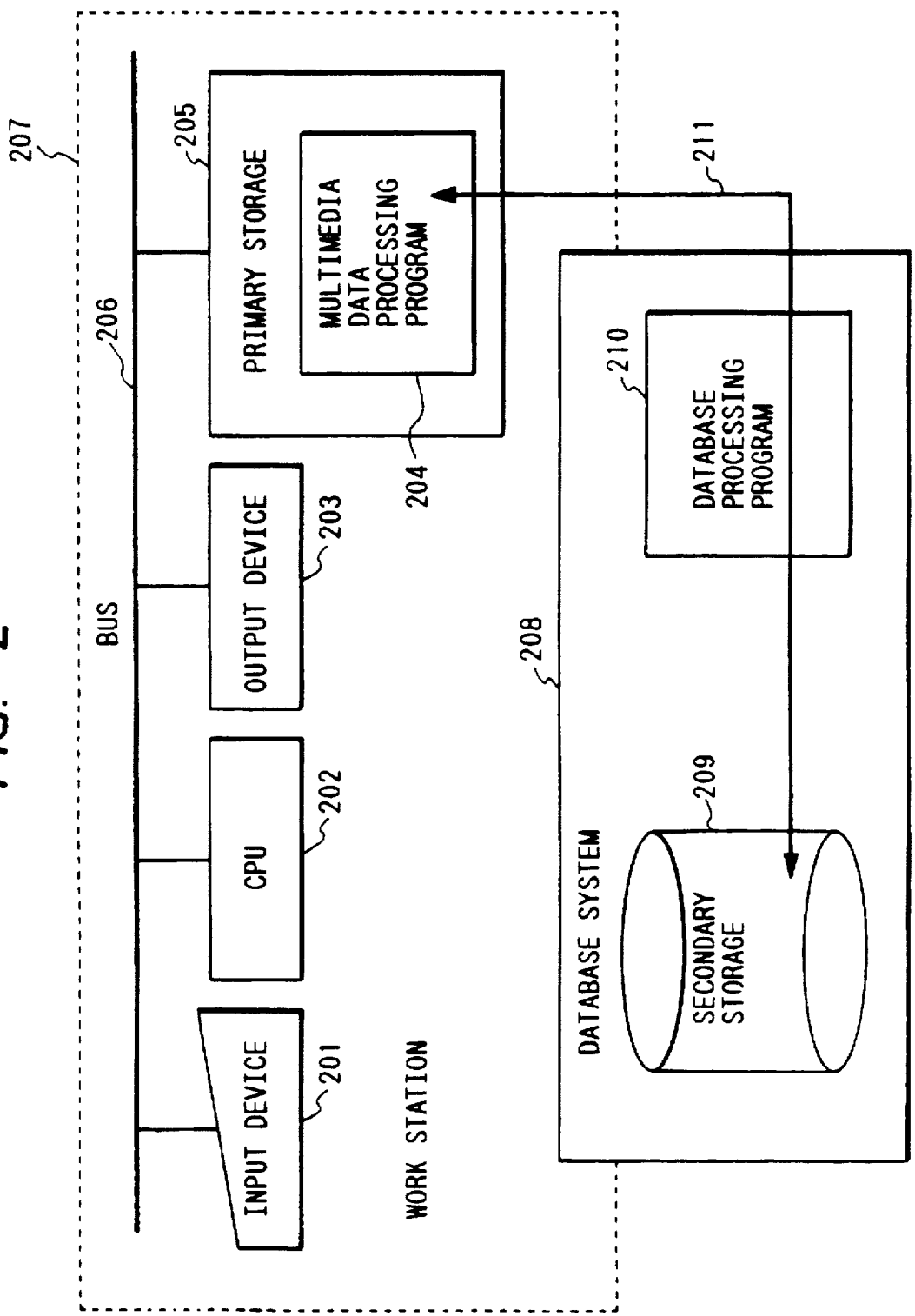
FIG. 2 shows a system configuration of a multi-media data retrieval system in accordance with one embodiment of the present invention.

FIG. 2 shows a system configuration of the present embodiment. In FIG. 2, numeral 201 denotes an input device such as a keyboard, a mouse or a scanner for inputting commands and data by a user of the multi-media data retrieval system.

Numeral 202 denotes a CPU which is a processor to store a procedure of a flow chart shown in a drawing to be explained later based on the input from the input device 201 and to execute the process of the present embodiment based on the stored procedure.

Numeral 203 denotes an output device for displaying the multi-media data retrieved by the processing of the CPU 202.

Numeral 204 denotes a multi-media data processing program for retrieving the multi-media data and providing to the user the processing function of the retrieved data.

Numeral 205 denotes a main memory for temporarily storing the multi-media data processing program 204 and data necessary for the execution thereof.

The elements 201 to 203 and 205 are coupled by a computer bus 206 to form a work station 207. The multi-media data retrieval system of the present embodiment operates on the work station 207. In the present embodiment, a plurality of equivalents to the work station 207 may be provided. In this case, the same program as the multi-media data processing program 204 is executed on each work station so that a plurality of users may be simultaneously served.

Numeral 208 denotes a database system for managing the multi-media data. It provides service such as the retrieval of the multi-media data to the multi-media data retrieval system. It primarily comprises a secondary storage 2.09 such as a hard disk for storing and saving the multi-media data and a database processing program 210 for retrieving and managing the multi-media data in response to the request from the multi-media data processing program 204, and operates on the work station 207 or a separate computer having a similar configuration.

In the present embodiment, the function of sharing the data and the program codes which is a heart of the present invention is provided by the database processing program 210 in the database system 208. Numeral 211 denotes means for coupling the database system 208 and the multi-media data processing program 204 to allow the exchange of data between the systems. The coupling is usually attained by a computer network and an inter-process communication function performed thereon.

Figure 3:
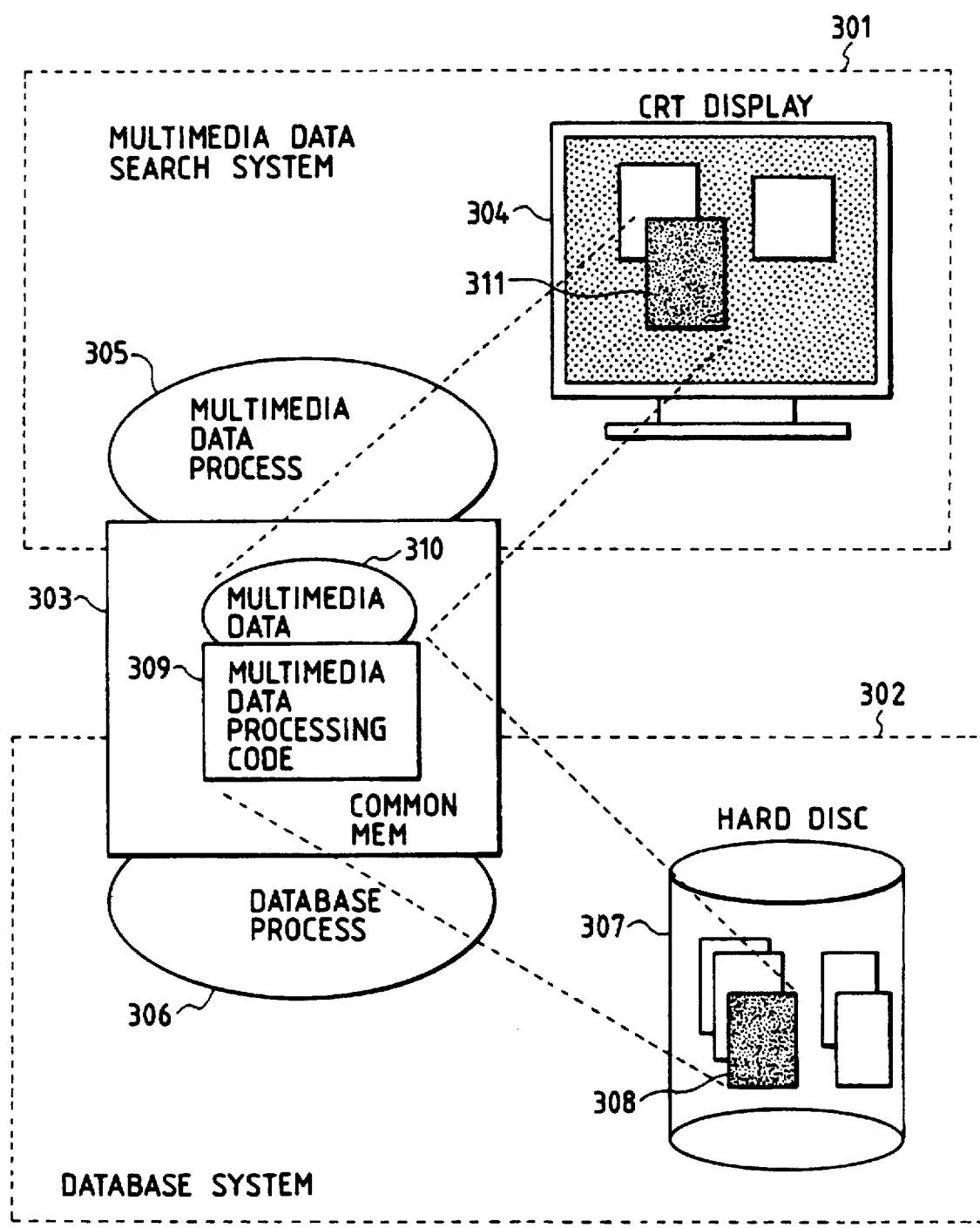
FIG. 3 illustrate an injection process in the multi-media data retrieval system.
Figure 4:
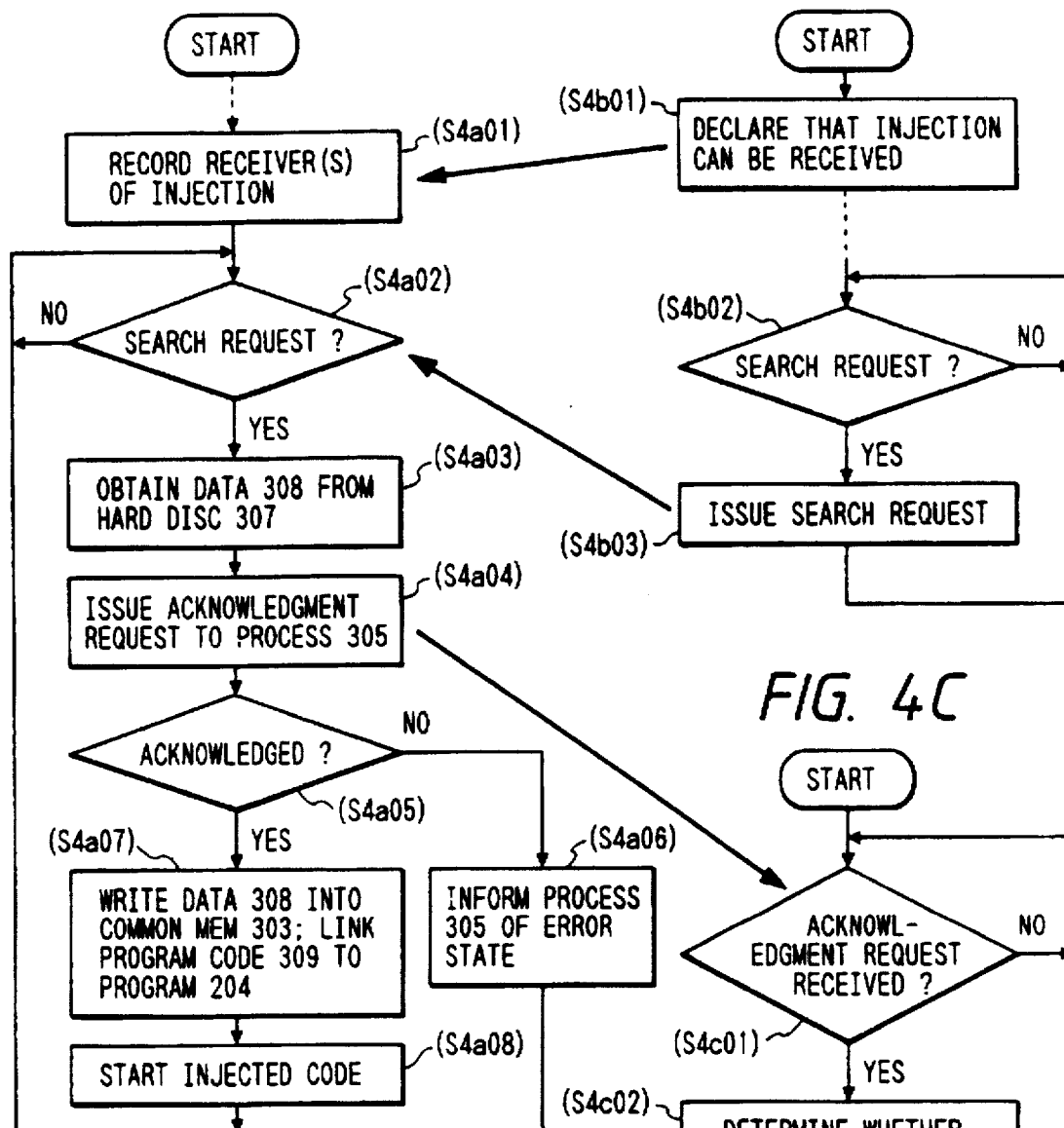
FIGS. 4A, 4B and 4C are flow charts for illustrating the injection process in the multi-media data retrieval system.

FIG. 3 shows a conceptual view of the processing by the multi-media data processing program 204 and the database processing program 210 operated on the system configuration of FIG. 2. The subsequent description is made by primarily referring to FIGS. 3 through 4C which will be described later.

In FIG. 3, numeral 301 denotes a multi-media data retrieval system which operates on the work station 207 of FIG. 2, and numeral 302 denotes the database 208 of FIG. 3. Numeral 303 denotes a shared memory for holding the multi-media data shared by the multi-media data retrieval system 301 and the database system 302. Numeral 304 in the multi-media data retrieval system 301 denotes a CRT display which is used as one of the output devices 203. The result for the retrieval command by the user of the multi-media data retrieval system is displayed thereon.

Numeral 305 denotes a multi-media data processing process which represents a form when the multi-media data processing program 204 operates on the work station 207, and numeral 306 denotes a database processing process which represents the database processing program 210.

Numeral 307 denotes a hard disk corresponding to the secondary storage 207. Numerals 308, 309, 310 and 311 denote represent various forms of the multi-media data. Namely, numeral 308 denotes a data format of the multi-media data on the hard disk 307, and numerals 309 and 310 represent data formats of the data on the shared memory 303. They are the program code for processing the multi-media data and the multi-media data itself, respectively. Numeral 311 represents the bit map data format on the CRT display 304 and it corresponds to the display of the result of the retrieval requested by the user of the multi-media data retrieval system.

The conversion between the data formats is conducted by the multi-media data processing process 305 and the database processing process 306. For example, in the process of displaying the data 308 on the hard disk 307 on the display 304 as the result of the retrieval by the user, the data 308 is first converted to the data formats 309 and 310 in the shared memory by the database processing process 306 and written into the shared memory 303. The conversion such as the substitution of the reference data to other data by a pointer on the shared memory (which is referred to as sizzling) is conducted. Then, the program code 309 is built in the multi-media data processing process 305 and it is executed.

Through the processing of the program code 309, the multi-media data 310 is converted to the data format 311 for the CRT display and it is displayed.

The built-in of the data and the program codes between the programs is hereinafter referred to as "injection" and an implementation mechanism therefor is referred to as an "injection mechanism".

Figure 1A:
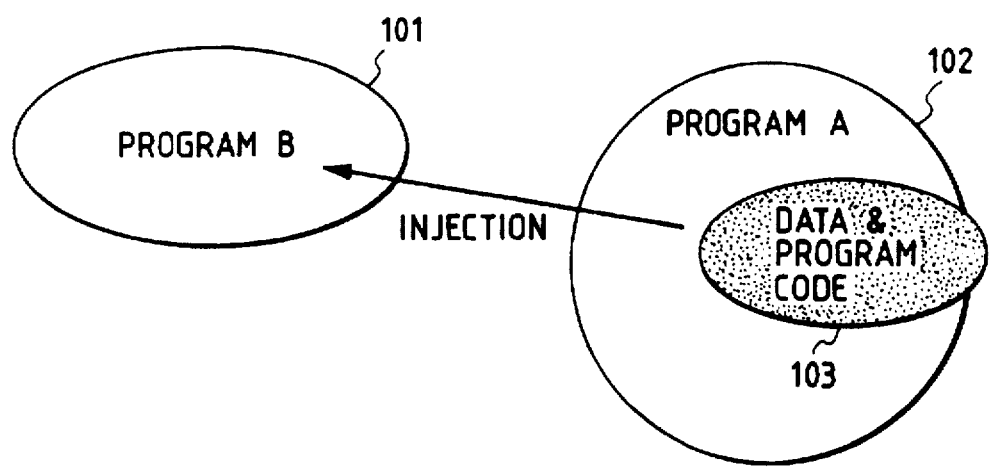
FIGS. 1A and 1B show conceptual views of an injection mechanism of the present invention.
Figure 1B:
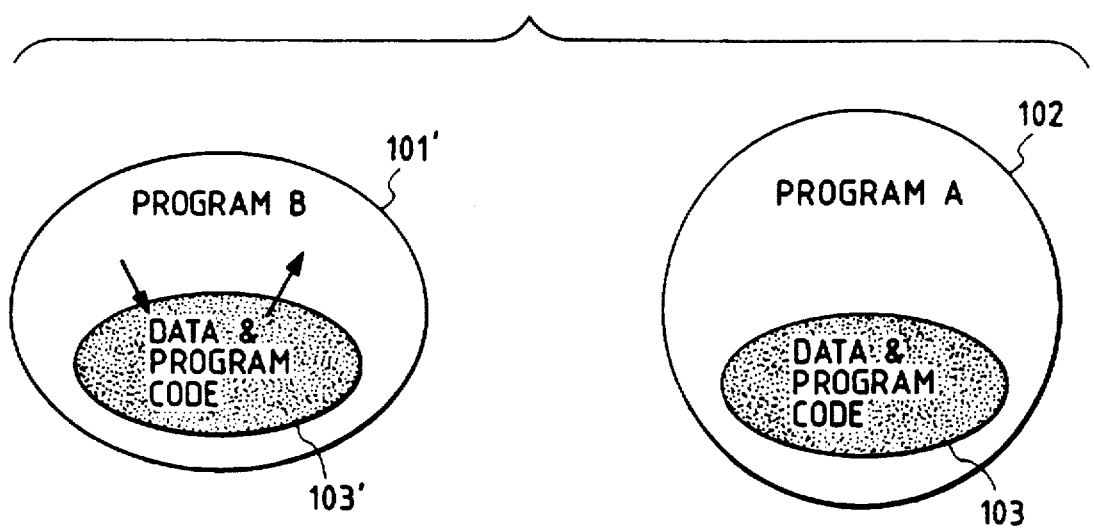

FIGS. 1A and 1B represent operation images of the injection mechanism. In FIG. 1A, a program-B 101 adds (or substitutes) data and an executable program code 103 to a program-A 102.

FIG. 1B shows a result of processing of FIG. 1A and a program-B 101' represents the program-B 101 after the addition of the program code 103. A program 103' represents the program code 103 having the program-B 101' added thereto. By operating the program code 103' in the program-B 101', the operation which the program-A 102 intends can be forced. In the present embodiment, the intended operation corresponds to the display of the data 308 on the CRT display 304.

In the present embodiment, the injection mechanism is implemented in the following manner. The transmission of request between processes is attained by an inter-process communication mechanism (such as a socket) provided by an operating system such as UNIX. In order to implement means for sharing or adding or changing the data and the program code the shared memory system is used as a basic mechanism of data sharing, and the program code which is placed in the shared memory in a form of binary data is injected in the operating process by using the dynamic loading/linking mechanism. If the program code depends only on other shared data, the dynamic loading/linking mechanism is not necessary and only the program code and the data referred to thereby may be written in the shared memory. The shared data and the program code may be executed by using a mechanism which can generate a new process flow (which is referred to as an activity) such as a thread or a light weight process generation mechanism which is supported in a recent operating system. The generation of the new activity is, however, usually permitted to only other activity which is present in the same program. In this case, it is necessary to define an inter-program interface which allows the generation of the activity from other program. The acknowledgement of the addition and execution request of the data and the program code may be made by checking the validity of the data by reading the data and the program code which are in the shared memory and not linked yet and checking the contents thereof. As a specific determination method, a mechanism of succeeding a class in the object oriented language is utilized to determine if the data is an instance of a sub-class of a particular class and only the instance of the sub-class is validated. In the present embodiment, however, since the multi-media data processing process 305 itself does not bear important data and most of data are managed by the database processing process 306, the injection is validated without condition. An embodiment of the acknowledgement in the injection will be explained in the embodiment to be described later.

As means for solving the conflict of the addition and execution request of the data and the program code, the respective requests may be prioritized and a highest priority request may be adopted. In the present embodiment, as will be described later, the conflict of requests does not occur. Means for solving the conflict will be explained in an embodiment to be described later.

Finally, as parallel control means for a plurality of procedures which are present in one process, a change access control mechanism based on a lock which is used in the prior art object oriented database system to share the data is used not for each process as it is in the prior art but for each of the activities which may be simultaneously present in the process. A mechanism to prioritize the activities to execute a specific activity preferentially is required. In the present embodiment, the program 309 to be injected always has a higher priority than that of a main procedure of the multi-media data processing process 305 and it is executed preferentially.

An operation of the present embodiment in accordance with the configuration described above is now explained by using flow charts of FIGS. 4A, 4B and 4C. The flow charts represent the main procedure of the multi-media data processing process 305, the injection mechanism in the database processing process and the injection acknowledgement procedure which is conducted before the injection of the program code 309. The flow charts are apparently independent but they are related in that one step of one flow chart causes the start of the process of other flow chart. A plurality of process flows may be simultaneously present in one process.

In the description of the present embodiment, It is assumed that the database processing process 306 has been started prior to the multi-media data processing process 305. It is also assumed that only one database processing process 306 is started and the simultaneous occurrence of two or more injections does not occur.

(S4b01) After the start of the multi-media data processing process 305, it declares that it is ready to accept the injection.

(S4a01) The database processing process 306 detects the declaration for the acceptance of the injection by the multi-media data processing process 305 and stores it (for example, registers the multi-media data processing program 305 in an injection acceptance list). Thereafter, when the retrieval of the multi-media data is requested by the user of the multi-media data retrieval system (S4b02), the multi-media data processing data process 305 requests to the database processing process 306 the retrieval of data 308 designated by the user (S4b03). At this time point, the process of the multi-media data processing process 305 returns to the accept state of the input from the user and the next request is accepted (S4a02). The subsequent process is executed mainly by the database processing process 306.

(S4a02) When the retrieval request of the data 308 is informed to the database processing process 306, the requested data 308 is read from the hard disk 307 together with the information added to the retrieval request (S4a03).

(S4a04) The database processing process 306 issues an acknowledgement request of the injection of the read data 308 to the multi-media data processing program 305. The acknowledgement request includes the generation of the injection and the information in the injection. The acknowledgement procedure in the multi-media data processing program detects the acknowledgement request of the injection (S4c01), determines if the acknowledgement of the injection is permitted (S4c02) and informs the result to the database processing program 306 (S4c03). If the acknowledgement of the injection is not accepted (S4a05), the injection is not executed and an error is sent to the multi-media data processing process 305. The error is displayed on the CRT display 304 and informed to the user of the system (S4a06).

(S4a07) When the injection is accepted, the necessary data 308 is converted to the program code 309. The program code and the multi-media data 310 are placed on the shared memory 303.

The program code 309 may be shared by the data 308 and the data which the program 309 previously referred to. In this case, the program code 309 is already present on the shared memory 303 and only the multi-media data 310 is placed in the shared memory 303 although the relation between the program code 309 and the multi-media data 310 (which is processed by the program code 309) is maintained. The program code 309 is dynamically linked to the multi-media data processing program 204. If the program code 309 has been linked by the previous process, the linking is not conducted. At this time point, the multi-media data processing process 305 is ready to process the data through the shared memory 303.

(S4a08) The activity is imparted to the program code 309 which is linked to the multi-media data processing program 204 and injected to the multi-media data processing program 305 and it is executed. The program code 309 displays the data on the CRT display 304. The process of the database processing process 306 itself is completed at this time point and the occurrence of the next request is monitored (S4a02). Finally, the execution of the program code 309 is completed and the processing of the command inputted by the user is completed. By the injection described above, the present embodiment attains the following advantages.

1. By subsequently building in the browsing (display) mechanism of the multi-media data by using the injection, the reading of the new type of data, the compliance to the change of the data format and the display of the data may be efficiently conducted without changing the multi-media data processing program 204.

2. By separating the program code 309 from the main procedure of the multi-media data processing process 305, the separate activity from the main procedure is imparted and the execution speed under the multi-processor environment is improved.

A program code shared system which is a second embodiment of the present invention is now explained with reference to FIGS. 5 through 7C. The program code shared system means a software system in which a portion (procedure) of a program is managed by a database to separate it from the program itself to facilitate the sharing of the program code and the expansion and modification of the program.

Figure 5:
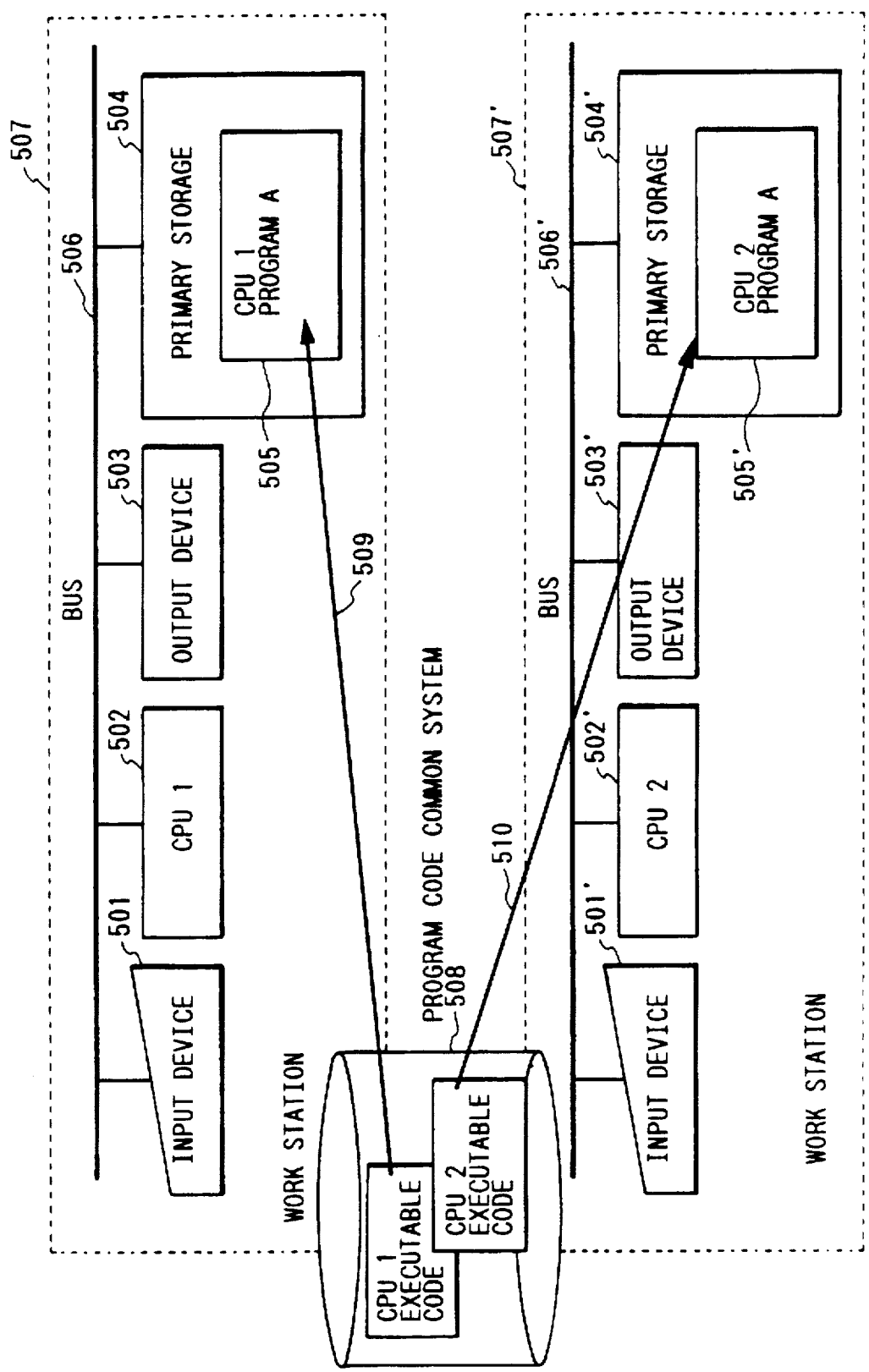
FIG. 5 shows a system configuration of a program code shared system in accordance with a second embodiment of the present invention.

FIG. 5 shows a system configuration in the present embodiment, which is substantially same as that of the multi-media data retrieval system.

In FIG. 5, numerals 501 and 501' denote input devices such as keyboards or mice through which the user of the application program which operates on the present embodiment inputs commands or data.

Numerals 502 and 502' denote CPU's for executing the application programs based on the inputs from the input devices 501 and 501'. It is assumed here that the CPU 502 and the CPU 502' have different instruction sets.

Numerals 503 and 503' denote output devices such as CRT displays or printers for displaying the multi-media data retrieved by the processes of the CPU 502 and the CPU 502'.

Numerals 504 and 504' denote memories for temporarily storing the application programs 505 and 505' which operate on the present embodiment and the data necessary for the processing thereof.

Numerals 506 and 506' denote computer buses for coupling the elements 501 to 504 and 501' to 504', which form work stations 507 and 507'. The application programs 505 and 505' operate on the work stations 507 and 507', respectively. Numeral 508 a program management database which stores and manages executable program codes. The program management database 508 operates on the work station 507 or 507' or on a separate computer having a similar configuration.

In the present embodiment, the sharing mechanism of the data and the program code which is a heart of the present invention is provided by an interface library (to be described later) linked to the program management database 508 and the application programs 505 and 505'.

In the present embodiment, a plurality of program management databases which are similar to the program management database 508 may be present simultaneously. In this case, however, the management of one program code by a plurality of different program management database is inhibited.

Numeral 509 and 510 denote injection mechanisms which are means for coupling the program management database 508 and the application programs 505 and 505' to allow the sharing of the program codes. It may be implemented by using the computer network and the inter-process communication mechanism implemented thereon.

Figure 6:
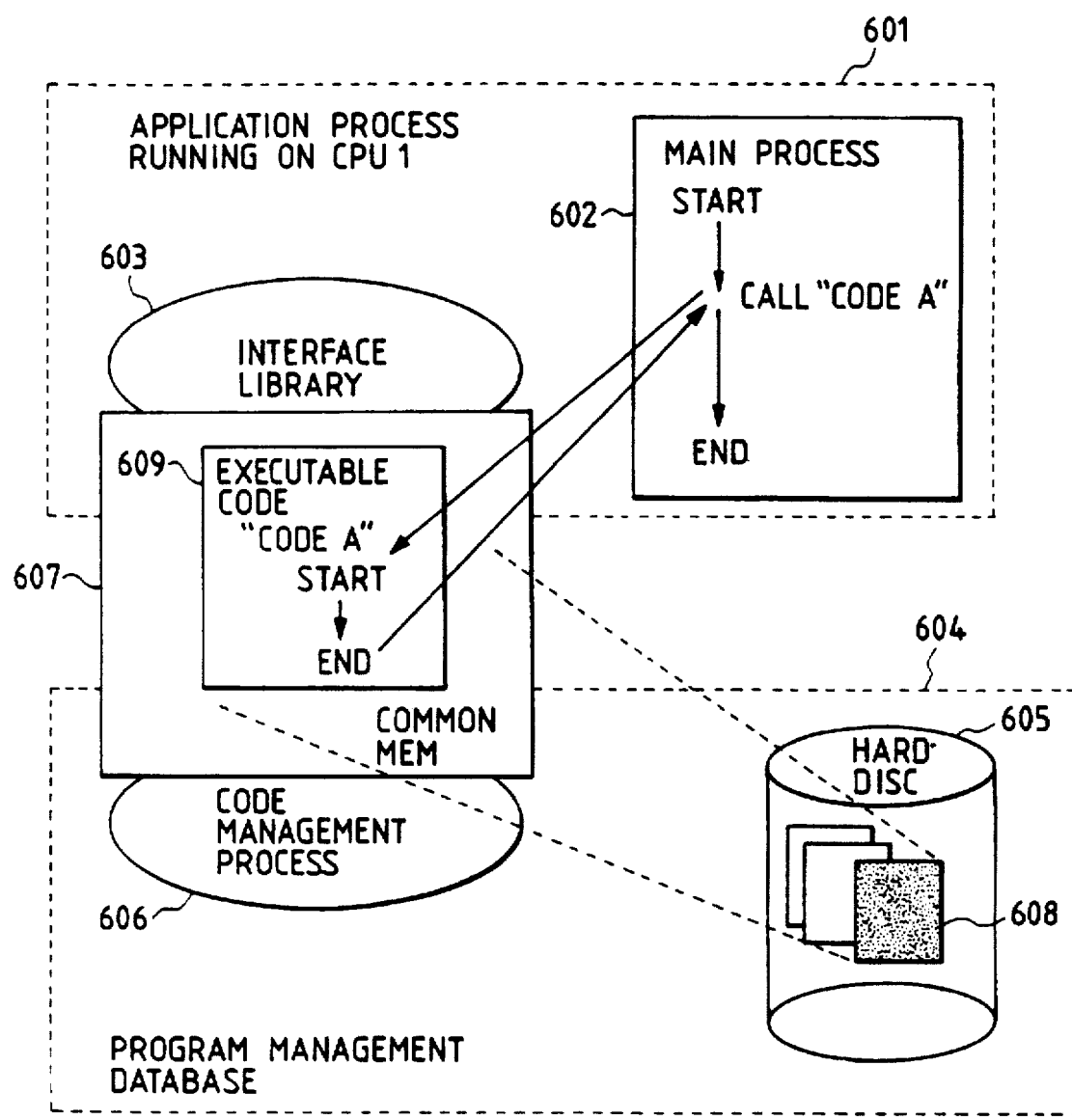
FIG. 6 illustrate an injection process in the program code shared system.

FIG. 6 represents a process conducted between the application program 505 operated on the system of FIG. 5 and the program management database 508.

The following description is done mainly based on FIG. 6. A similar process is conducted between the application program 505' and the program management database 508.

In FIG. 6, numeral 601 denotes an application process which represents a process executed by the application program 505 of FIG. 5.

Numeral 602 denotes a main procedure of the application process 601.

Numeral 603 denotes a library which provides an interface to the program management database from the application process 601 and a mechanism of acknowledgement procedure in the injection process.

Numeral 604 denotes the program management database 505 of FIG. 5 which comprises a hard disk 605 for storing and saving the program codes and a code management process 606 which retrieves and manages the program codes and, in the present embodiment, plays a role of the injection process.

Numeral 607 denotes a shared memory for holding the program codes provided by the program management database 604 to the application process 601.

Numerals 608 and 609 denote data formats on the hard disk 605 and the shared memory 607, respectively, of the program code added to the application program 601. In the present embodiment, the conversion from the data 608 to the program code 609 primarily comprises the reference destination solution such as a procedure call which is conducted by the link to the application process 601. In the present embodiment, in the program code in which the reference depends on the application program, two or more program code images may be generated from the data on the hard disk to the shared memory.

In this manner, the program code 609 linked to the application process 601 is called from the main procedure 602 and executed. In the present embodiment, the injection mechanism is implemented in the same manner as that of the previous embodiments but the acknowledgement process in the execution of the injection is different. In the present embodiment, the acknowledgement is imparted to the program code which is most suitable to the current situation. Namely, whether it is suitable to the current situation or not is evaluated based on the result of an appropriate evaluation function to which two parameters, an execution speed and the order of memory consumption, which represent the feature of the program code are applied. Those parameters which represent the feature of the program codes are imparted to each program code when it is stored in the program management database. When it is not possible to discriminate the injected program code by those parameters, the program management databases are prioritized and the program code which is validated for the injection is determined in accordance with the priority. As a parameter to determine the priority among the program management databases, the distance to the network is used so that program code which is nearest to the network is validated.

An operation of the present embodiment with the above configuration is explained with reference to flow charts of FIGS. 7A, 7B and 7C. The flow charts show process flows of the injection acknowledgement procedure in the main procedure 602, the code management process 606 and the support library interface 603, respectively. The flow charts are apparently independent but they are related in that one step of one flow chart causes the start of other flow chart. A plurality of process flows may be simultaneously present in the process. In the description of the present embodiment, it is assumed that the code management process 606 is started prior to the application process 601.

(S7b01) After the application process 601 is started, it declares that is ready to accept the injection. This is automatically conducted by the support library 603.

(S7a01) The code management process 606 detects the injection acceptance declaration of the application process 601 and registers the application process 601 to an injection acceptance destination list.

(S7a02) The code management process 606 sends back an acknowledgement message to the application process 601.

(S7b02) The application process 601 detects the acknowledge message of the code management process 606 and registers the code management process 606 in an injection candidate list. When a procedure call in the application program is executed in a subsequent process (S7b03), the procedure call is detected by the code management process 606 as an injection start even 701 (S7a03). At this time point, the process of the application process 601 is interrupted.

(S7a04) When the code management process 606 detects the event 701, it reads necessary program code 608 from the hard disk 605 based on the information added to the event 701 (which relates to the procedure call by the main procedure 602 and includes a procedure name and an ID number for uniquely defining the required procedure). The read program code 608 is written in the shared memory 607 as it is. In this process, a plurality of equivalent programs which respond to the same input with the same result may be present on the hard disk 605. For example, the program codes may be managed by the CPU's in a binary form to cope with various types of CPU's or there may be several implementations which have the same significance but different execution efficiencies. In such cases, the requested code may be uniquely defined based on the information added to the event 701.

(S7a05) The code management process 606 issues an injection acknowledgement request of the read program code 608 to the application process 601. The acknowledgement request includes the generation of injection and the information on the injected program code (or the injected program code 608 itself). This information is used for the determination of the acceptance of the injection and the adjustment when more than one injection requests conflict. At this time point, the process to the application process 601 in the code processing process 604 is interrupted until the acknowledgement is completed. It does not affect to the injection process for other application process.

(S7c01) The acknowledgement procedure in the support library 603 detects the injection acknowledgement request. In the present embodiment, the acknowledgement requests from all program management databases which can provide the program codes to be injected are collected. (The program management databases which cannot provide the program codes to be injected issues "non-acknowledgement requests" to inform it.)

(S7c02) One of the injection requests is selected to permit the acknowledgement.

(S7c03) The acceptance of the acknowledgement of the selected program management database is informed and the rejection of the acknowledgement of other program management databases is informed. It is now assumed that the program management database 604 is acknowledged. If no request is acknowledged, the support library 603 conducts an exceptional process.

(S7a06, S6a07) The program code 608 is dynamically linked to the application process 601 and converted to the program code image 609 on the shared memory.

(S7a08) The injection of the program code 609 to the application process 601 is informed.

(S7b04) The application process 601 resumes the interrupted procedure call so that the injected program 609 is executed.

By the use of the injection, the present embodiment offers the following advantages.

1. Since the application program can select an optimum one from the codes provided by the plurality of code management programs, a request which varies with a situation such as a request to complete the process in a predetermined time, a limitation to the size of memory used, or a request for a large scale exceptional process for an error, can be satisfied.

2. Since the communication between the code management program and the application program is automatically conducted by the library interface 603, no substantial burden is imparted to the developer of the application program and the affect of the change in the code management program to the application program is minimized. As a variation of the present embodiment, a program source instead of the executable code may be managed by the code management program. In this case, it may be compiled or interpreted as required to cope with various types of CPU's.

What is claimed is:

1. In a data processing system for executing a process using a first program and a second program in a coordinated fashion, each program including executable codes and data, a program controlling method comprising the steps of:

providing a portion of the data and executable codes from the first program to the second program; and forcibly adding or forcibly substituting and executing the portion of the data and the executable codes provided by the first program to the second program during the execution of the process, wherein the portion of the data and the executable codes are provided by injection, bidirectionally, and the injection and execution of data and program code are Permitted by the second program and are conducted by imparting an acknowledgement from the second program of the addition or substitution and the execution of the data and codes from the first program.

2. A program controlling method according to claim 1 wherein a shared memory is used to share the data and the program code.

3. A program controlling method according to claim 1, wherein the portion of the data and the executable codes are provided in accordance with a status of the process execution in the second program.

4. A program controlling method according to claim 1 wherein a mechanism for solving a request conflict when the addition or substitution and the execution of the data and program codes from a plurality of programs are requested is provided.

5. A program controlling method according to claim 1 wherein a protocol of process conducted between the first program and the second program is defined as the data and program code are added or substituted and executed.

6. A program controlling method according to claim 1 wherein a mechanism for parallel control between a plurality of program codes present in the second program is provided.

7. A program controlling method according to claim 1 wherein the data and program code to be added or substituted and executed are added to the first program from time to time.

8. A program controlling method according to claim 1 wherein the first program and the second program are executed on different computers through a network.

9. In a data processing system for executing a process using a first program and a second program in a coordinated fashion, each program including executable codes and data, a program controlling apparatus comprising:

means for providing a portion of the data and executable codes from the first program to the second program during the execution of the process; and means for forcibly adding or substituting and executing the data and the executable codes provided by the first program to the second program during the execution of the process, wherein the portion of the data and the executable codes are provided by injection, bidirectionally, and the injection and execution of data and program code are permitted by the second program and are conducted by imparting an acknowledgement from the second program of the addition or substitution and the execution of the data and codes from the first program.

10. A program controlling apparatus according to claim 9 wherein a shared memory is used to share the data and the program code.

11. A program controlling apparatus according to claim 9 wherein the portion of the data and executable codes are provided in accordance with a status of the process execution in the second program.

12. A program controlling apparatus according to claim 9 wherein a mechanism for solving a request conflict when the addition or substitution and the execution of the data and program codes from a plurality of programs are requested is provided.

13. A program controlling method according to claim 9 wherein a protocol of process conducted between the first program and the second program is defined as the data and program code are added or substituted and executed.

14. A program controlling apparatus according to claim 9 wherein a mechanism for parallel control between a plurality of program codes present in the second program is provided.

15. A program controlling method according to claim 9 wherein the data and program code to be added or substituted and executed are added to the first program from time to time.

16. A program controlling method according to claim 9 wherein the first program and the second program are executed on different computers through a network.

* * * * *

UNITED STATES PATENT AND TRADEMARK OFFICE
CERTIFICATE OF CORRECTION

PATENT NO. : 5,894,573

DATED : April 13, 1999

INVENTOR(S) : TOSHIHKO FUKASAWA ET AL.

Page 1 of 2

It is certified that error appears in the above-identified patent and that said Letters Patent is hereby corrected as shown below:

ON THE COVER PAGE AT [56] REFERENCES CITED

"Objectstore" should read --The Objectstore--.

COLUMN 2

Line 22, "to" should be deleted.
Line 29, "for the" should read --for--.
Line 59, "that;" should read --that:--.

COLUMN 4

Line 7, "that" should read --that the--.
Line 17, "illustrate" should read --illustrates--.
Line 25, "illustrate" should read --illustrates--.
Line 34, "referred" should read --referred to--.

COLUMN 5

Line 6, "2.09" should read --209--.
Line 24, "on" should read --in--.
Line 46, "represent" should be deleted.

COLUMN 6

Line 43, "program." should read --programs.--.

COLUMN 7

Line 22, "It" should read --it--.
Line 66, "on" should read --in--.

UNITED STATES PATENT AND TRADEMARK OFFICE
CERTIFICATE OF CORRECTION

PATENT NO. : 5,894,573
DATED : April 13, 1999
INVENTOR(S) : TOSHIHIKO FUKASAWA, ET AL.

Page 2 of 2

It is certified that error appears in the above-identified patent and that said Letters Patent is hereby corrected as shown below:

COLUMN 8

Line 67, "508" should read --508 denotes--.

COLUMN 9

Line 14, "database" should read --databases--.
    Line 16, "Numeral" should read --Numerals--.

COLUMN 10

Line 20, "other" should read --the other--.
    Line 40, "even" should read --event--.

COLUMN 11

Line 1, "to" should be deleted.
    Line 39, "affect" should read --effect--.
    Line 61, "Permitted" should read --permitted--.

Signed and Sealed this

Sixteenth Day of November, 1999

Attest:

Q. TODD DICKINSON

*Attesting Officer*   *Acting Commissioner of Patents and Trademarks*